United States Patent
Lieberman et al.

(10) Patent No.: US 12,179,618 B1
(45) Date of Patent: Dec. 31, 2024

(54) ELECTRIFIED VEHICLE WITH SYNCHRONOUS SWITCHING CONVERTER SUPPORTING EXPORTABLE POWER AND DC FAST CHARGING

(71) Applicant: Ford Global Technologies, LLC, Dearborn, MI (US)

(72) Inventors: Colin Turner Lieberman, Ferndale, MI (US); Prahlad Saggere, Wixom, MI (US); Haider Mhiesan, Dearborn, MI (US); Christopher Ballard, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/364,899

(22) Filed: Aug. 3, 2023

(51) Int. Cl.
*B60L 53/20* (2019.01)
*B60L 50/60* (2019.01)
*B60L 53/10* (2019.01)

(52) U.S. Cl.
CPC ............ *B60L 53/20* (2019.02); *B60L 50/60* (2019.02); *B60L 53/11* (2019.02); *B60L 2210/10* (2013.01)

(58) Field of Classification Search
CPC .......... B60L 53/20; B60L 50/60; B60L 53/11; B60L 2210/10; B60L 53/10
See application file for complete search history.

(56) References Cited

U.S. PATENT DOCUMENTS

| 8,929,098 B2 | 1/2015 | Takegami |
| 9,007,040 B2 | 4/2015 | Ikeda et al. |
| 10,523,112 B2 | 12/2019 | Yan et al. |

FOREIGN PATENT DOCUMENTS

KR 20220108759 A 8/2022

*Primary Examiner* — Robert L Deberadinis
(74) *Attorney, Agent, or Firm* — Brooks Kushman PC; David B. Kelley

(57) ABSTRACT

An electrified vehicle includes a synchronous switching DC/DC voltage converter, switches configured to selectively connect external charging terminals to a traction battery, the voltage converter, and external load terminals, and at least one controller programmed to operate the voltage converter and control the switches to connect the external charging terminals to the voltage converter and the external load terminals based on nominal voltage of the traction battery relative to voltage at the external charging terminals and a requested voltage supplied to the external load terminals. An associated method includes controlling the plurality of switches to selectively connect the external charging terminals, the voltage converter, and the external load terminals; and controlling whether the voltage converter operates to increase or decrease voltage based on which one or more of the voltage converter, the external charging terminals, the external load terminals, and the traction battery are connected by the plurality of switches.

20 Claims, 4 Drawing Sheets

| Use Case | SG1 | SG2 | S3 | S4 | S5 | S6 | S7 | ePTO Pre-Charge Mechanism | Converter Mode | ePTO Load Enable |
|---|---|---|---|---|---|---|---|---|---|---|
| DCFC 800V | Closed (2) | Closed (3) | Closed (1) | Open | Open | Open | Open | N/A | Disabled | Disabled (410) |
| DCFC 400V | Closed (2) | Closed (3) | Open | Closed (1) | Closed (4) | Open | Open | N/A | Boost (4) | Disabled (420) |
| DCFC 800V + ePTO 400V | Closed (2) | Closed (3) | Closed (1) | Open | Closed (4) | Closed (4) | Open | Converter Operating in buck direction (6) | Buck (5) | Enabled (7) (430) |
| DCFC 400V + ePTO 400V (EVSE Voltage) | Closed (2) | Closed (4) | Open | Closed (1) | Closed (5) | Closed (5) | Open | Converter Operating in buck direction (3) | Boost (6) | Enabled (7) (440) |
| EVSE Disconnected ePTO 400V | Closed (1) | Open | Open | Open | Closed (2) | Closed (2) | Open | Converter Operating in buck direction (3) | Buck (4) | Enabled (5) (450) |
| Unregulated Battery Voltage ePTO | Closed (1) | Open | Open | Open | Open | Closed (2) | Closed (4) | Converter Operating in buck direction (3) | Disabled except for pre-charge | Enabled (5) (460) |
| DCFC 800V + ePTO Unregulated | Closed (1) | Closed (5) | Closed (4) | Open | Open | Closed (2) | Closed (6) | Converter Operating in buck direction (3) | Disabled except for pre-charge | Enabled (7) (470) |
| DCFC 400V + ePTO Unregulated | Closed (1) | Closed (5) | Open | Closed (4) | Open | Closed (2) | Closed (6) | Converter Operating in buck direction (3) | Boost (7) | Enabled (8) (480) |

FIG. 4

ELECTRIFIED VEHICLE WITH SYNCHRONOUS SWITCHING CONVERTER SUPPORTING EXPORTABLE POWER AND DC FAST CHARGING

TECHNICAL FIELD

This application is related to a synchronous switching converter supporting exportable power and DC fast charging of an electrified vehicle.

BACKGROUND

Electrified vehicles, including electric and hybrid vehicles, may be used in various commercial applications where upfitters have a need to supply power to upfitted equipment, such as refrigeration units and hydraulic motors, for example. For equipment powered directly from the vehicle traction battery, the wide range of battery voltages on existing and future vehicles can make compatibility a challenge. This may require upfitter equipment to have different variants to support different vehicle battery voltages. Voltage ripple created by other components on the high voltage bus is also a potential issue that could create compatibility challenges. Voltage compatibility is also a concern between existing electric vehicle supply equipment (EVSE) that may operate at 400V or 800V for DC fast charging and associated electrified vehicle architectures which may utilize 800V traction battery packs, for example. Other challenges for various commercial applications may include simultaneously providing power to an external load and DC fast charging, lowering voltage ripple on the external load side, and supporting both 400V and 800V external loads, for example.

SUMMARY

In various embodiments, an electrified vehicle includes an electric machine arranged to selectively provide propulsive torque to wheels of the electrified vehicle, a traction battery electrically coupled to the electric machine, a synchronous switching DC/DC voltage converter, a plurality of switches configured to selectively connect external charging terminals to the traction battery, the voltage converter, and external load terminals, and at least one controller programmed to selectively operate the voltage converter and control the plurality of switches to connect the external charging terminals to the voltage converter and the external load terminals based on nominal voltage of the traction battery relative to voltage detected at the external charging terminals and a requested voltage supplied to the external load terminals. The one or more controllers may be programmed to, in response to the voltage detected at the external charging terminals being a DC voltage within a predetermined range of the nominal voltage of the traction battery, control a first one of the plurality of switches to connect at least one of the external charging terminals to the traction battery, and control at least a second one of the plurality of switches to disconnect at least one of the external load terminals from the voltage converter and the traction battery to charge the traction battery. The one or more controllers may be programmed to, in response to the voltage detected at the external charging terminals being a DC voltage outside the predetermined range and less than the nominal voltage of the traction battery, control the first one of the plurality of switches to disconnect at least one of the external charging terminals from the traction battery, control at least the second one of the plurality of switches to connect at least one of the external load terminals to the voltage converter, and control the voltage converter to increase the DC voltage from the external charging terminals to the nominal voltage of the traction battery to charge the traction battery.

In one or more embodiments, the one or more controllers is programmed to, in response to the requested voltage supplied to the external load terminals being a DC voltage less than the nominal voltage of the traction battery, and the DC voltage detected at the external charging terminals being within a predetermined range of the nominal voltage of the traction battery: control a first one of the plurality of switches to connect at least one of the external charging terminals to the traction battery and a high voltage terminal of the voltage converter; control a second one of the plurality of switches to disconnect at least one of the external charging terminals from a low voltage terminal of the voltage converter; control at least a third one of the plurality of switches to connect the low voltage terminal of the voltage converter to one of the external charging terminals; and control the voltage converter to decrease the DC voltage detected at the external charging terminals to the requested voltage supplied to the external load terminals. The one or more controllers may be further programed to, in response to the requested voltage supplied to the external load terminals being a DC voltage less than the nominal voltage of the traction battery, and the DC voltage detected at the external charging terminals being within a predetermined range of the nominal voltage of the traction battery, control at least a fourth one of the plurality of switches to disconnect the traction battery from the external load terminals.

In one embodiment, the one or more controllers is programmed to, in response to the requested voltage supplied to the external load terminals and the voltage detected at the external charging terminals being a DC voltage less than the nominal voltage of the traction battery: control a first one of the plurality of switches to disconnect at least one of the external charging terminals from the traction battery and from a high voltage terminal of the voltage converter; control a second one of the plurality of switches to connect at least one of the external charging terminals to a low voltage terminal of the voltage converter; control at least a third one of the plurality of switches to connect at least one of the external charging terminals to at least one of the external load terminals; and control the voltage converter to increase the DC voltage detected at the external charging terminals to the nominal voltage of the traction battery. The one or more controllers may be further programmed to, in response to the requested voltage supplied to the external load terminals and the voltage detected at the external charging terminals being a DC voltage less than the nominal voltage of the traction battery, control at least a fourth one of the plurality of switches to disconnect the traction battery from the external load terminals.

In various embodiments, the one or more controllers is further programmed to, in response to the requested voltage supplied to the external load terminals and the voltage detected at the external charging terminals being a DC voltage less than the nominal voltage of the traction battery: control at least a fourth one of the plurality of switches to connect the traction battery to the external load terminals; and control at least a fifth one of the plurality of switches to disconnect a low voltage terminal of the voltage converter from at least one of the external load terminals.

In one or more embodiments, the one or more controllers is programmed to, in response to the requested voltage supplied to the external load terminals being a DC voltage less than the nominal voltage of the traction battery: control a first one of the plurality of switches to disconnect at least one of the external charging terminals from the traction battery and from a high voltage terminal of the voltage converter; control a second one of the plurality of switches to disconnect at least one of the external charging terminals from a low voltage terminal of the voltage converter; control at least a third one of the plurality of switches to connect the low voltage terminal of the voltage converter to at least one of the external load terminals; control at least a fourth one of the plurality of switches to disconnect the traction battery from at least one of the external load terminals; and control the voltage converter to decrease the DC voltage from the traction battery to the requested voltage supplied to the external load terminals.

Embodiments also include a method for controlling an electrified vehicle having a traction battery electrically coupled to an electric machine, a synchronous DC/DC voltage converter, and a plurality of switches configured to selectively connect external charging terminals to the voltage converter, the traction battery, and external load terminals, the method comprising, by a vehicle controller, based on nominal voltage of the traction battery relative to DC voltage detected at the external charging terminals and a predetermined DC voltage selectively delivered to the external load terminals: controlling the plurality of switches to selectively connect the external charging terminals, the voltage converter, and the external load terminals; and controlling whether the voltage converter operates to increase or decrease voltage based on which one or more of the voltage converter, the external charging terminals, the external load terminals, and the traction battery are connected by the plurality of switches.

In various embodiments, the plurality of switches include: a first switch between a first one of the external charging terminals and the traction battery; a second switch between the first external charging terminal and a low voltage terminal of the voltage converter; a third switch between the second switch and a first one of the external load terminals; a fourth switch between a second one of the external charging terminals and a second one of the external load terminals, and a fifth switch between the first switch and the third switch. In one operating configuration, the method further includes, responsive to the DC voltage detected at the external charging terminals being within a predetermined range of the nominal voltage of the traction battery: closing the first switch; opening the second, third, fourth, and fifth switches; and disabling the voltage converter. In another operating configuration, the method further includes, responsive to the DC voltage detected at the external charging terminals being less than the nominal voltage of the traction battery: opening the first, third, fourth, and fifth switches; closing the second switch; and operating the voltage converter to increase voltage from the external charging terminals to the nominal voltage of the traction battery.

In another operating configuration, the method further includes, responsive to the DC voltage detected at the external charging terminals being within a predetermined range of the nominal voltage of the traction battery, and the predetermined DC voltage being less than the nominal voltage of the traction battery: closing the first, third, and fourth switches; opening the second and fifth switches; and operating the voltage converter to decrease voltage from the external charging terminals to the predetermined DC voltage. In another operating configuration, the method further includes, responsive to the DC voltage detected at the external charging terminals and the predetermined DC voltage both being less than the nominal voltage of the traction battery: closing the second, third, and fourth switches; opening the first and fifth switches; and operating the voltage converter to increase voltage from the external charging terminals to the nominal voltage of the traction battery. In another operating configuration, the method further includes, responsive to no DC voltage detected at the external charging terminals and the predetermined DC voltage being less than the nominal voltage of the traction battery: closing the third and fourth switches; opening the first, second, and fifth switches; and operating the voltage converter to decrease voltage from the traction battery to the predetermined DC voltage supplied to the external load terminals. In another operating configuration, the method further includes closing the fourth and fifth switches; opening the first, second, and third switches; and disabling the voltage converter to provide unregulated traction battery voltage to the external load terminals. In another operating configuration, the method further includes, responsive to the DC voltage detected at the external charging terminals being within a predetermined range of the nominal traction battery voltage: closing the first, fourth, and fifth switches; opening the second and third switches; and disabling the voltage converter to provide unregulated voltage from the external charging terminals to the external load terminals.

In one or more embodiments, an electrified vehicle system includes a traction battery; a bi-directional synchronous DC/DC voltage converter; a plurality of switches configured to selectively connect at least one of the voltage converter and the traction battery to at least one of external charging terminals and external load terminals; and a controller programmed to operate the voltage converter in one of a disabled mode, boost mode, and buck mode based on which of the voltage converter, the traction battery, the external charging terminals, and the external load terminals are connected, and responsive to voltage of the traction battery relative to voltage at the external charging terminals and voltage supplied to the external load terminals. The plurality of switches may be implemented by a first switch between a first one of the external charging terminals and the traction battery; a second switch between the first external charging terminal and a low voltage terminal of the voltage converter; a third switch between the second switch and a first one of the external load terminals; a fourth switch between a second one of the external charging terminals and a second one of the external load terminals; and a fifth switch between the first switch and the third switch. The controller may be programmed to operate the plurality of switches and the voltage converter to simultaneously supply power from the external charging terminals to the traction battery and the external load terminals.

One or more embodiments may have various associated advantages relative to an isolated dedicated DC/DC converter module to support upfitted or external loads. For example, the integrated synchronous switching converter design may reduce required material and associated mass, reduce package space, and enable higher power to be supplied to electric power take-off (ePTO) loads to facilitate upfitted commercial applications for electrified vehicles.

BRIEF DESCRIPTION OF THE DRAWINGS

FIG. 4 is a chart illustrating other configurations of a bi-directional synchronous DC/DC voltage converter and switching arrangement according to the embodiment of FIG. 2.

DETAILED DESCRIPTION

As required, detailed representative examples of the claimed subject matter are disclosed herein; however, it is to be understood that the disclosed examples are merely representative and may be implemented in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

In one or more embodiments, an electrified vehicle includes a synchronous switching converter that supports both boost operation for DC (direct current) EVSE (electrified vehicle supply equipment) that are unable to operate at the nominal high voltage of the traction battery, and buck operation to supply power to upfitted or external loads operating at lower (high) voltage than the traction battery and/or EVSE. The system is designed to provide flexibility to accommodate various electrified vehicle applications including commercial vehicles upfitted with additional equipment. The system may include an 800V traction battery and accommodate 400V and 800V DC fast charging, for example, supply external (or upfitted equipment) loads at 400V or 800V while simultaneously performing DC fast charging of the traction battery, supply 400V external loads while disconnected from the EVSE, etc. The system may also include a bypass mode to support unregulated supply of power from the EVSE to upfitted loads when the load requires more power than the synchronous HV/HV DC/DC switching converter is capable of supplying.

Figure 1:
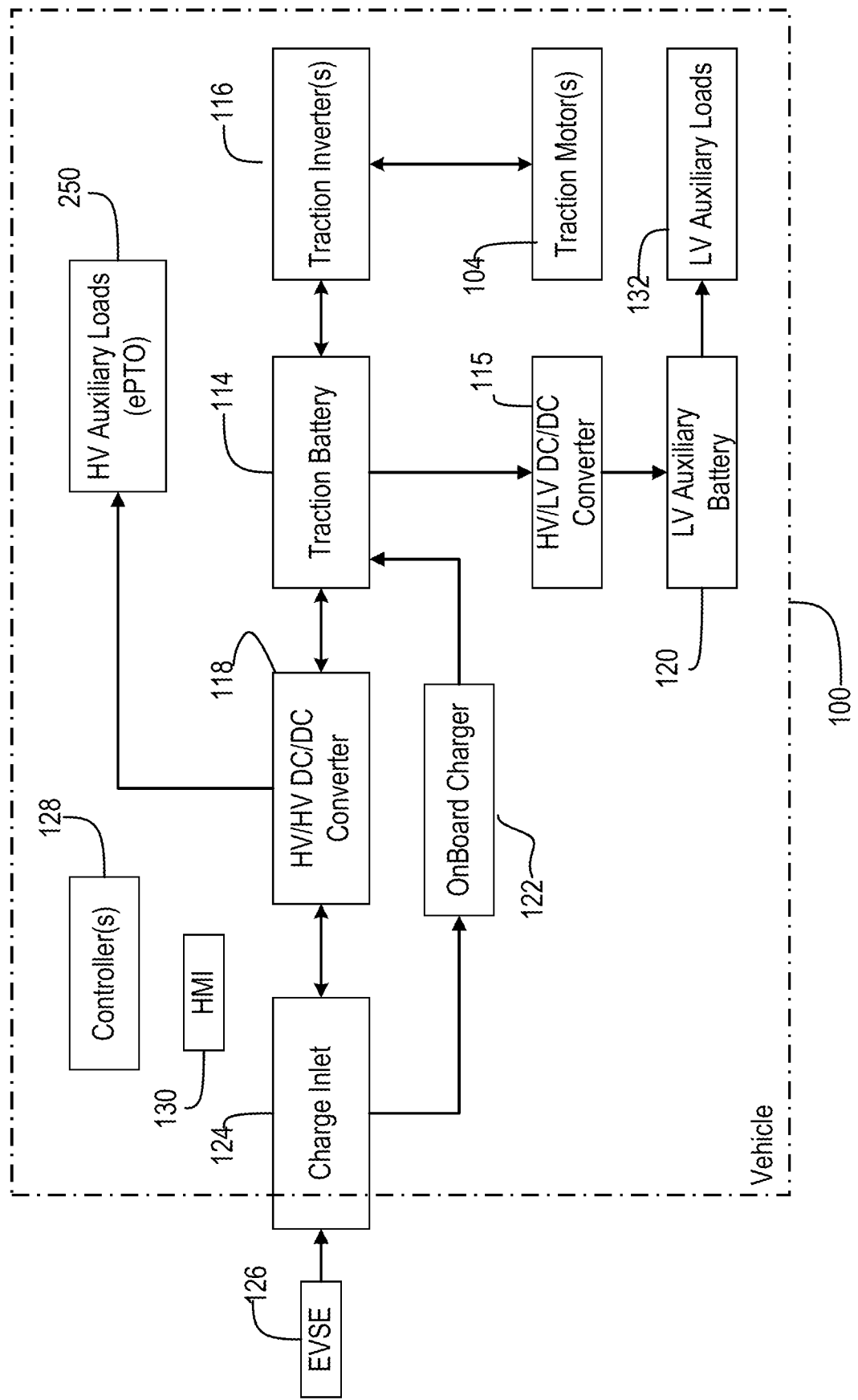
FIG. 1 is a block diagram illustrating a representative electrified vehicle including a bi-directional synchronous DC/DC voltage converter and switching arrangement according to one or more embodiments.

FIG. 1 depicts an example of an electrified vehicle 100, which is implemented as a battery electric vehicle (BEV) in this example, but generally represents any electrified vehicle, such as a plug in hybrid electric vehicle (PHEV), for example. The electrified vehicle 100 may comprise one or more three-phase electric machines 104 that may be controlled to provide torque to vehicle wheels. The electric machines 104 may operate as motors, generators, or both and can extend the range of the vehicle by recovering energy during regenerative braking.

Traction battery or battery pack 114 stores energy that can be used by the electric machines 104 and that may be used to power various on-board and external vehicle loads. A vehicle battery pack 114 typically provides a high voltage (HV) DC output provided by connecting hundreds of low voltage cells together. The battery pack 114 is electrically connected to one or more traction inverters 116. The traction inverter 116 is also electrically connected to the electric machines 104 and provides the ability to bi-directionally transfer energy between the battery pack 114 and the electric machines 104. For example, a typical battery pack 114 may provide a DC voltage/current while the electric machines 104 may require a three-phase AC voltage/current. The traction inverter 116 converts the DC voltage to a three-phase AC current as required for the electric machine 104 and may also be referred to as a power electronics module in various applications. Traction inverter 116 may also include a voltage converter that increases the DC voltage from the battery pack 114 supplied to the HV DC bus that powers the inverter. In a regenerative mode, the traction inverter 116 will convert the three-phase AC current from the electric machines 104 acting as generators to the DC voltage required to recapture energy in the battery pack 114.

In addition to providing energy for propulsion, the battery pack 114 may provide energy for other vehicle electrical systems and external loads to facilitate vehicle upfitters to add specialized equipment for particular applications. A bi-directional synchronous HV/HV DC/DC converter module 118 converts the higher HV DC output of the battery pack 114 to a lower HV DC supply when operating in a buck mode or direction, and converts a lower HV DC input from an external supply to a higher HV DC voltage that is compatible with other vehicle loads, such as HV auxiliary loads (ePTO) 250, when operating in a boost mode or direction. Higher HV DC loads, such as compressors and electric heaters, may be connected directly to the high-voltage bus from the battery pack 114. External load terminals that facilitate upfitting of commercial vehicles may by supplied with the higher HV DC voltage (such as 800V) or a lower HV DC voltage (such as 400V), both of which exceed 60V and are therefore considered "high" voltage for electric mobility applications, depending on the particular application and implementation. In a typical vehicle, the low voltage (LV) auxiliary loads 132 are electrically connected to a 12V, 24V, or 48V LV battery 120. A HV/LV DC/DC converter 115 may convert the HV bus voltage to a LV bus voltage compatible with LV auxiliary battery 120 and LV auxiliary loads 132. For example, as explained in greater detail herein, the traction battery 114 may operate at a higher DC voltage, such as 800V DC with commercial vehicles having external load terminals supplied with either 800V DC or 400V DC to facilitate upfitting with equipment having higher power requirements than typical passenger vehicles.

The battery pack 114 may be recharged by an external power source via Electric Vehicle Supply Equipment (EVSE) 126. The EVSE 126 provides AC or DC power to the vehicle 102 by electrically connecting through external charging terminals of a charge port 124. As described in greater detail herein, the EVSE (when connected) may also supply power to external load terminals to facilitate powering of upfitted equipment 250 and simultaneous charging of the traction battery 114. The charge port 124 may be any type of port configured to transfer power from EVSE 126 to the vehicle 100. The charge port 124 may be electrically connected to an onboard charger 122, sometimes referred to as a power conversion module or charging module. The onboard charger 122 may condition the power from the EVSE 126 to provide the proper voltage and current levels to the battery pack 114. In some applications, EVSE 126 may be configured to provide the proper voltage and current levels to the battery pack 114 and the onboard charger 122 may not be necessary. The functions of the onboard charger 122 may reside in the EVSE 126 in some applications. When implemented as a DC fast charger, EVSE 126 provides constant power with DC voltage between 200V-1000V, for example. DC fast charging (DCFC) may bypass the onboard charger 122.

The vehicle electric machines, battery, traction inverter(s), DC/DC converters, and various other control modules, components, or systems may be controlled by a vehicle or powertrain controller or control module (PCM) 128. Alternatively, or in combination, various systems or subsystems may include associated control modules or controllers in communication with PCM 128 over a vehicle wired or wireless network to provide coordinated control of the vehicle. As used in this disclosure, a controller generally refers to one or more control modules or controllers that may cooperate to perform a particular task or function and is not limited to a single controller or any particular dedicated controller or control module.

Controller 128 may receive input from a human-machine interface (HMI) 130 and stores associated user preferences in a non-transitory computer readable storage medium or memory (not shown). User preferences may include a specified configuration or operating mode for the HV/HV DC/DC voltage converter 118 and switch arrangement according to the disclosure. Alternatively, the configuration or operating mode may be selected using a selectively connected programming tool, DIP switches, jumpers, or other persistent signaling strategies that are used by controller 128 to control the HV/HV DC/DC voltage converter 118 and associated switching arrangement to control connections among the external charging terminals (FIG. 2), HV/HV DC/DC voltage converter 118, traction battery 114, and external load terminals (FIG. 2).

Figure 2:
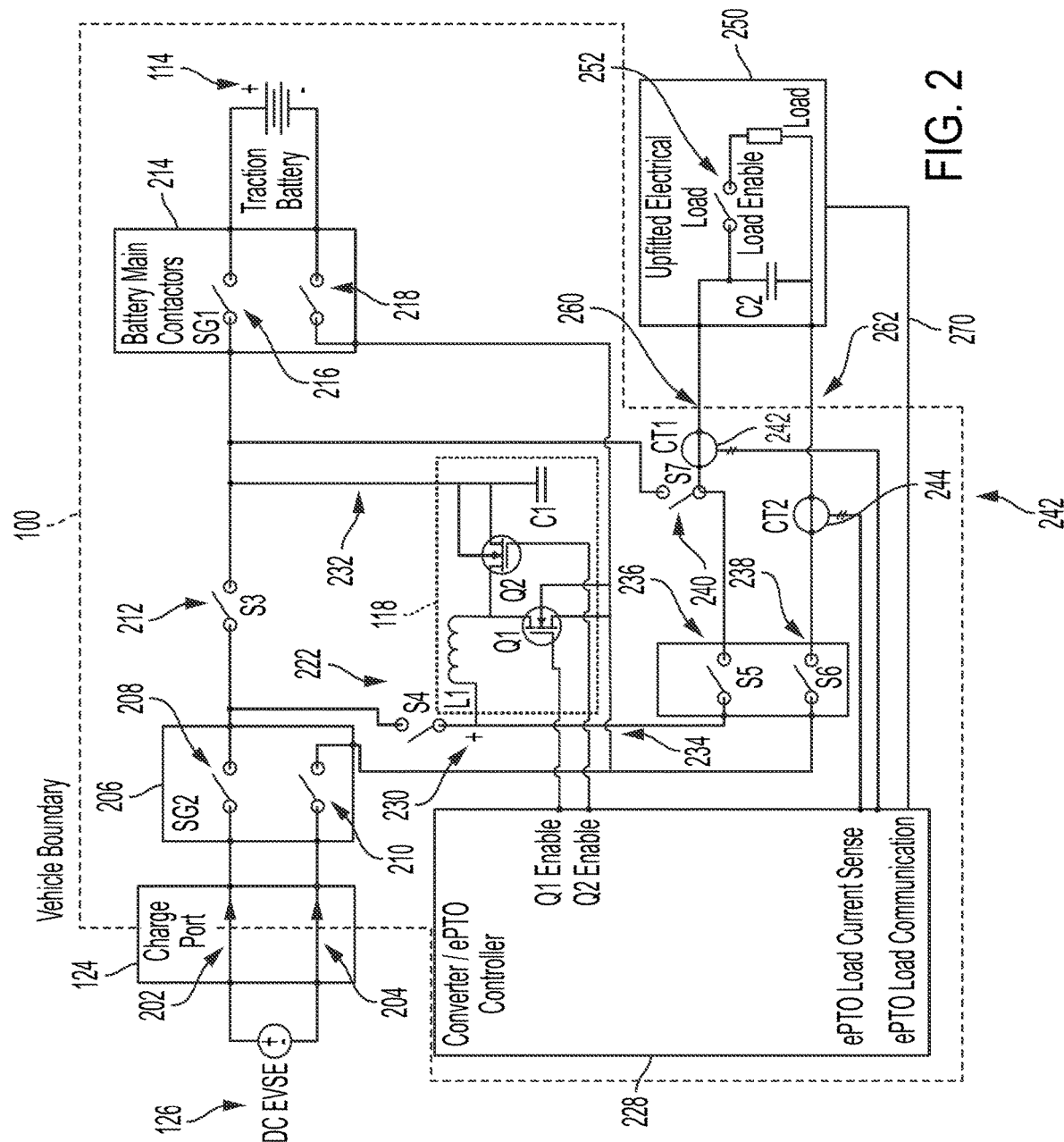
FIG. 2 is a diagram illustrating operation of a representative embodiment of a system or method for controlling an electrified vehicle system having a bi-directional synchronous DC/DC voltage converter and switching arrangement according to the disclosure.

FIG. 2 is a diagram illustrating operation of a representative embodiment of a system or method for controlling an electrified vehicle system having a bi-directional synchronous HV/HV DC/DC voltage converter and switching arrangement according to the disclosure. The various switches, switch groups, and contactors illustrated in FIG. 2 are controlled by one or more controllers, such as vehicle controller 128, to open and close in response to corresponding control signals. The switches, switch groups, and contactors may be implemented by electromechanical or solid state devices on one or more substrates or chips, such as MOSFETs or IGBTs, for example.

EVSE 126 provides DC Fast Charging (DCFC) via a cable that may be connected to charge port 124 of electrified vehicle 100 to provide power to first and second external charging terminals 202, 204, respectively. In this representative embodiment, power may be supplied at 800V, which corresponds to the nominal voltage of traction battery 114, or 400V. Of course, the representative voltage values may vary depending on the particular implementation of the DCFC EVSE and vehicle architecture.

Switch group 206 (SG2) includes switches or contactors 208, 210 that are operated together by an associated controller, such as controller 128 (FIG. 1), to connect the external charging terminals 202, 204 to the switching arrangement and bi-directional synchronous switching DC/DC voltage converter 118 based on the state of various switches as described herein and illustrated with respect to representative use cases in FIG. 4. A first switch 212 (S3) is positioned between the first external charging terminal 202 and a corresponding terminal of traction battery 114, which may be selectively connected to the vehicle electrical bus by operation of the battery main contactors 216, 218 of switch group 214 (SG1) as controlled by one or more vehicle controllers, such as controller 128 (FIG. 1). A second switch 222 (S4) is positioned between the first external charging terminal 202 and the lower voltage terminal 230 of HV/HV DC/DC voltage converter 118. The higher voltage terminal 232 of HV/HV DC/DC voltage converter 118 is connected to a first terminal of traction battery 114 via contactor 216, and to a third switch 236 (S5). Third switch 236 (S5) is positioned between second switch 222 (S4) and a first terminal 260 of external load 250. The negative or common terminal 234 of DC/DC voltage converter 118 is connected to the second external charging terminal 204 (via contactor 210), to the negative terminal of traction battery 114 (via contactor 218), and to a fourth switch 238 (S6). Fourth switch 238 (S6) is positioned between second external charging terminal 204 and second external load terminal 262. A fifth switch 240 (S7) is positioned between first switch 212 (S3) and third switch 236 (S5).

As also illustrated in FIG. 2, controller 228 may provide switching enable signals to associated transistors Q1 and Q2 of voltage converter 118 and receive feedback signals from external load (ePTO) current sensors 242, 244 and communicate with the external load via communication signal line 270 to provide a load enable signal for load enable switch 252 to selectively power the external load 250. Depending on the particular use case or scenario, controller 228 may disable bi-directional synchronous switching voltage converter 118, operate voltage converter 118 in a buck direction/mode with power provided to higher voltage terminal 230 that is converted by operation of switches/transistors Q1, Q2 to a lower voltage at lower voltage terminal 232, or operate converter 118 in a boost direction/mode with power provided to lower voltage terminal 232 and converted to a higher voltage at higher voltage terminal 230. A different direction/mode may be used during pre-charging of the external load circuit than during steady-state operation as noted in the representative use cases illustrated in FIG. 4. In one embodiment, voltage converter 118 may be operated in a buck direction/mode to convert 800V power supplied by traction battery 114 or external DCFC 126 to 400V power provided to external load 250. Similarly, voltage converter 118 may be operated in a boost direction/mode to convert 400V power supplied by external DCFC 126 to 800V power for charging traction battery 114 and/or providing 800V power to external load 250. Likewise, boost direction/mode may be enabled to convert 800V power from traction battery 114 to 400V power supplied to external load 250.

Figure 3:
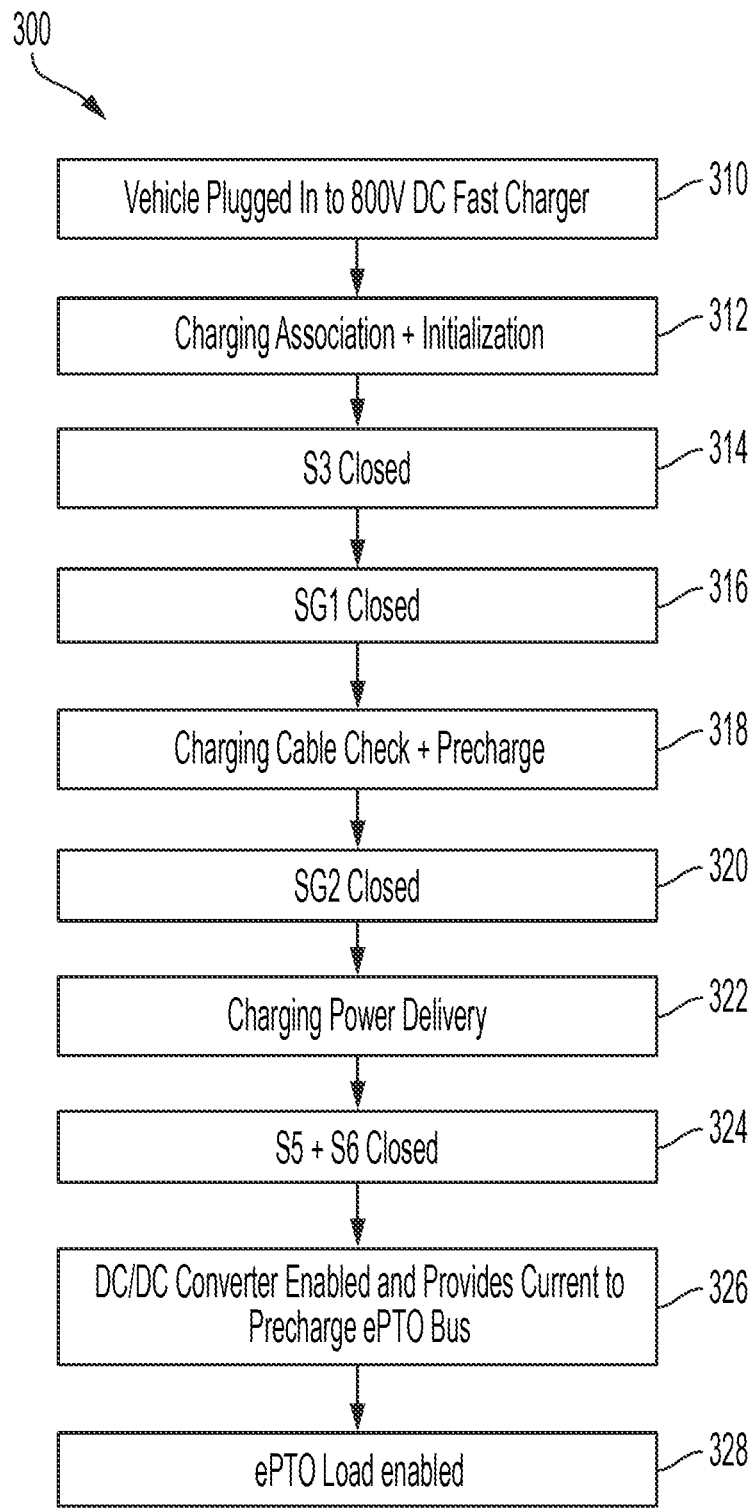
FIG. 3 is a simplified flow chart illustrating operation of a representative configuration of a bi-directional synchronous DC/DC voltage converter and switching arrangement according to the embodiment of FIG. 2.

FIG. 3 is a flowchart illustrating operation of a representative system or method for controlling an electrified vehicle bi-directional synchronous switching HV/HV DC/DC voltage converter and switching arrangement according to the disclosure. One or more controllers, such as controller 128 (FIG. 1) and 228 (FIG. 2) may cooperate with one or more other controllers to perform one or more control functions described herein. Control logic, functions, code, software, strategy etc. performed by one or more processors or controllers such as controllers 128, 228 may be represented by the block diagrams, charts, or flow charts shown in the various figures. The flow chart or block diagram 300 of FIG. 3 illustrates a representative control strategy, algorithm, and/or logic for operation of an electrified vehicle voltage converter and a plurality of associated switches to enable selective connections among external charging terminals, the voltage converter, the traction battery, and external load terminals for various use cases and corresponding configurations. One or more processing strategies such as event-driven, interrupt-driven, multi-tasking, multi-threading, and the like may be utilized depending on the particular application and implementation. As such, various steps or functions illustrated or described may be performed in the sequence as illustrated or described, in parallel, or in some cases omitted. Although not always explicitly illustrated or described, one of ordinary skill in the art will recognize that one or more of the steps or functions may be repeatedly performed depending upon the particular processing strategy being used. Similarly, the order of processing is not necessarily required to achieve the features and advantages described herein, but is provided for ease of illustration and description of representative use scenarios. The control logic may be implemented primarily in software executed by a microprocessor-based vehicle, powertrain, or other controller or control module. Of course, the control logic may be implemented in software, hardware, or a combination of software and hardware in one or more controllers depending upon the particular application. When implemented in software, the control logic may be provided in one or more non-transitory computer-readable storage devices or media having stored data representing code or instructions executed by a computer or controller to control an electrified vehicle.

With reference to FIGS. 2-4, the control strategy 300 corresponds to a representative use case (430, FIG. 4) that corresponds to connecting to a DC fast charger (DCFC) of 800V as represented at 310 to simultaneously charge the traction battery and provide power at 400V to the external load terminals (also referred to as electric PTO or power take-off (ePTO) terminals). The vehicle exchanges associated charging information and hand-shaking communication signals to initialization power transfer from the DCFC EVSE to the electrified vehicle as represented at 312. The controller then closes switch S3 as represented at 314. Switch group SG1 (traction battery main contactors having two contactors/switches controlled together) is closed as represented at 316 to electrically connect the traction battery. A charging cable diagnostic/check and pre-charge voltage applied at 318 before closing switch group SG2 (external charging terminal contactors) connecting the 800V power from the DCFC EVSE to deliver charging power as represented at 322. The controller then closes switch S5 and switch S6 at 324 to connect the external load terminals. The DC/DC voltage converter is enabled and operated in a buck mode or direction to convert the higher voltage (800V) to a lower voltage (400V) and provides current to pre-charge the external load terminals of the ePTO bus as represented at 326. The ePTO load is then enabled at 328 to simultaneously provide 400V power to the external load terminals while charging the traction battery at a nominal battery voltage of 800V.

FIG. 4 illustrates representative operating or start-up sequencing of a switching arrangement and DC/DC voltage converter for various representative use cases or scenarios. With reference to FIGS. 2-4, each use case or scenario 410, 420, 430, 440, 450, 460, 470, and 480 illustrates a representative sequence (indicated by parenthetical sequencing numbers) for control of switch groups SG1 and SG2, switches S3, S4, S5, S6, S7, and whether the DC/DC voltage converter is disabled, or enabled and operated in the buck mode/direction or operated in the boost mode/direction during the ePTO pre-charge operation and then subsequent steady-state operation after the ePTO load enable signal is received. The illustrated use cases are representative and may vary based on the particular application and implementation. Similarly, the representative use cases are not exhaustive and the system may be controlled to facilitate other use cases.

In use case 410, the system is controlled to provide traction battery charging from a DCFC that provides voltage within a predetermined range of the nominal voltage of the traction battery (800V in this example) without simultaneously powering an external load. As represented by the sequencing numbers, S3 is closed followed by closing of the traction battery main contactors SG1, then closing of the external charging contactors SG2. Switches S4, S5, S6, S7 are open and there is no need for external load pre-charging because no external load is being powered. Similarly, the load enable switch is open or disabled and the DC/DC voltage converter is disabled because no voltage conversion is required between the DCFC EVSE and the traction battery.

In use case 420, the vehicle is connected to a 400V DCFC EVSE to charge the traction battery without directly powering any external load. The start-up sequence begins with switch S4 being closed to connect the lower voltage terminal of the DC/DC voltage converter to the associated external charging terminal. The battery main contactors (SG1) are then closed followed by the external charging contactors (SG2). Switches S3, S5, S6, and S7 are open with the voltage converter operated in the boost mode/direction to boost the external charging voltage (400V) from the external charging terminals to nominal traction battery voltage (800V) provided at the higher voltage terminal 232 of the voltage converter and to the traction battery through battery contactors SG1 to providing charging power for the battery. Because no external load is being powered, there is no need for ePTO pre-charge and the ePTO load enable switch or signal is disabled.

Use case 430 was previously described with respect to the flowchart of FIG. 3 and provides simultaneous traction battery charging (at 800V) and powering of an external load (at 400V) from an external DCFC.

Use case 440 provides simultaneous traction battery charging (at 800V) and powering of an external load (at 400V) from an external DCFC operating at 400V operating the DC/DC voltage converter in the buck direction during the ePTO pre-charge to lower the 800V traction battery voltage for pre-charging of the external load circuit before operating the DC/DC voltage converter in the boost direction to boost the 400V power from the DCFC EVSE to the 800V nominal traction battery voltage and charge the traction battery.

Use cases 450, 460 are cases where the electrified vehicle is not connected to an external DCFC. In use case 450, the system is controlled to provide 400V power to the external load. As such the DC/DC voltage converter operates in the buck direction to reduce traction battery voltage from 800V to 400V for pre-charging the external load circuit as well as steady-state powering of the external load. In use case 460, the DC/DC voltage converter is operated in the buck direction during pre-charging of the external load circuit, but then disabled to provide unregulated battery voltage to the external load.

Use cases 470, 480 provide unregulated power to the external load while simultaneously charging the traction battery. In use case 470, the external power is provided by 800V DCFC EVSE such that the DC/DC converter is operated in the buck direction for pre-charging the external load circuit, and then disabled with the unregulated 800V power provided to the external load. In use case 480, the external power is provided by 400V DCFC EVSE with the DC/DC voltage converter operated in the buck direction during pre-charging of the external load circuit and subsequently in the boost direction to boost 400V power from the DCFC to 800V power to charge the traction battery. The switching arrangement is controlled to provide 400V unregulated power to the external load.

While representative examples are described above, it is not intended that these examples describe all possible forms or implementations of the claimed subject matter. The words used in the specification are words of description rather than limitation, and it is understood that various changes may be made without departing from the scope of the claims. Additionally, the features of various implementing examples may be combined with one or more features from other examples to form further examples or embodiments of the claimed subject matter whether or not the particular combination of features is explicitly illustrated or described in detail. Although one or more examples or features may have been described as providing advantages over other examples or prior art implementations with respect to one or more desired characteristics, those of ordinary skill in the art recognize that one or more features or characteristics can be compromised to achieve desired overall system attributes, which depend on the specific application and implementation. As such, examples described as less desirable than others or prior art implementations with respect to one or more characteristics are not outside the scope of the disclosure and may be desirable for particular applications.

What is claimed is:

1. An electrified vehicle comprising:
an electric machine arranged to selectively provide propulsive torque to wheels of the electrified vehicle;
a traction battery electrically coupled to the electric machine;
a synchronous switching DC/DC voltage converter;
a plurality of switches configured to selectively connect external charging terminals to the traction battery, the voltage converter, and external load terminals; and
at least one controller programmed to selectively operate the voltage converter and control the plurality of switches to connect the external charging terminals to the voltage converter and the external load terminals based on nominal voltage of the traction battery relative to voltage detected at the external charging terminals and a requested voltage supplied to the external load terminals.

2. The electrified vehicle of claim 1 wherein the at least one controller is programmed to, in response to the voltage detected at the external charging terminals being a DC voltage within a predetermined range of the nominal voltage of the traction battery,
control a first one of the plurality of switches to connect at least one of the external charging terminals to the traction battery; and
control at least a second one of the plurality of switches to disconnect at least one of the external load terminals from the voltage converter and the traction battery to charge the traction battery.

3. The electrified vehicle of claim 2 wherein the at least one controller is programmed to, in response to the voltage detected at the external charging terminals being a DC voltage outside the predetermined range and less than the nominal voltage of the traction battery,
control the first one of the plurality of switches to disconnect at least one of the external charging terminals from the traction battery;
control at least the second one of the plurality of switches to connect at least one of the external load terminals to the voltage converter; and
control the voltage converter to increase the DC voltage from the external charging terminals to the nominal voltage of the traction battery to charge the traction battery.

4. The electrified vehicle of claim 1 wherein the at least one controller is programmed to, in response to the requested voltage supplied to the external load terminals being a DC voltage less than the nominal voltage of the traction battery, and the DC voltage detected at the external charging terminals being within a predetermined range of the nominal voltage of the traction battery:
control a first one of the plurality of switches to connect at least one of the external charging terminals to the traction battery and a high voltage terminal of the voltage converter;
control a second one of the plurality of switches to disconnect at least one of the external charging terminals from a lower voltage terminal of the voltage converter;
control at least a third one of the plurality of switches to connect the lower voltage terminal of the voltage converter to one of the external charging terminals; and
control the voltage converter to decrease the DC voltage detected at the external charging terminals to the requested voltage supplied to the external load terminals.

5. The electrified vehicle of claim 1 wherein the at least one controller is further programmed to, in response to the requested voltage supplied to the external load terminals being a DC voltage less than the nominal voltage of the traction battery, and the DC voltage detected at the external charging terminals being within a predetermined range of the nominal voltage of the traction battery, control at least a fourth one of the plurality of switches to disconnect the traction battery from the external load terminals.

6. The electrified vehicle of claim 1 wherein the at least one controller is programmed to, in response to the requested voltage supplied to the external load terminals and the voltage detected at the external charging terminals being a DC voltage less than the nominal voltage of the traction battery:
control a first one of the plurality of switches to disconnect at least one of the external charging terminals from the traction battery and from a high voltage terminal of the voltage converter;
control a second one of the plurality of switches to connect at least one of the external charging terminals to a lower voltage terminal of the voltage converter;
control at least a third one of the plurality of switches to connect at least one of the external charging terminals to at least one of the external load terminals; and
control the voltage converter to increase the DC voltage detected at the external charging terminals to the nominal voltage of the traction battery.

7. The electrified vehicle of claim 6 wherein the at least one controller is further programmed to, in response to the requested voltage supplied to the external load terminals and the voltage detected at the external charging terminals being a DC voltage less than the nominal voltage of the traction battery, control at least a fourth one of the plurality of switches to disconnect the traction battery from the external load terminals.

8. The electrified vehicle of claim 6 wherein the at least one controller is further programmed to, in response to the requested voltage supplied to the external load terminals and the voltage detected at the external charging terminals being a DC voltage less than the nominal voltage of the traction battery:
  control at least a fourth one of the plurality of switches to connect the traction battery to the external load terminals; and
  control at least a fifth one of the plurality of switches to disconnect a lower voltage terminal of the voltage converter from at least one of the external load terminals.

9. The electrified vehicle of claim 1 wherein the at least one controller is programmed to, in response to the requested voltage supplied to the external load terminals being a DC voltage less than the nominal voltage of the traction battery:
  control a first one of the plurality of switches to disconnect at least one of the external charging terminals from the traction battery and from a high voltage terminal of the voltage converter;
  control a second one of the plurality of switches to disconnect at least one of the external charging terminals from a lower voltage terminal of the voltage converter;
  control at least a third one of the plurality of switches to connect the lower voltage terminal of the voltage converter to at least one of the external load terminals;
  control at least a fourth one of the plurality of switches to disconnect the traction battery from at least one of the external load terminals; and
  control the voltage converter to decrease the DC voltage from the traction battery to the requested voltage supplied to the external load terminals.

10. A method for controlling an electrified vehicle having a traction battery electrically coupled to an electric machine, a synchronous DC/DC voltage converter, and a plurality of switches configured to selectively connect external charging terminals to the voltage converter, the traction battery, and external load terminals, the method comprising, by a vehicle controller, based on nominal voltage of the traction battery relative to DC voltage detected at the external charging terminals and a predetermined DC voltage selectively delivered to the external load terminals:
  controlling the plurality of switches to selectively connect the external charging terminals, the voltage converter, and the external load terminals; and
  controlling whether the voltage converter operates to increase or decrease voltage based on which one or more of the voltage converter, the external charging terminals, the external load terminals, and the traction battery are connected by the plurality of switches.

11. The method of claim 10 wherein the plurality of switches include:
  a first switch between a first one of the external charging terminals and the traction battery;
  a second switch between the first external charging terminal and a lower voltage terminal of the voltage converter;
  a third switch between the second switch and a first one of the external load terminals;
  a fourth switch between a second one of the external charging terminals and a second one of the external load terminals; and
  a fifth switch between the first switch and the third switch, the method further comprising, responsive to the DC voltage detected at the external charging terminals being within a predetermined range of the nominal voltage of the traction battery:
  closing the first switch;
  opening the second, third, fourth, and fifth switches; and
  disabling the voltage converter.

12. The method of claim 10 wherein the plurality of switches include:
  a first switch between a first one of the external charging terminals and the traction battery;
  a second switch between the first external charging terminal and a lower voltage terminal of the voltage converter;
  a third switch between the second switch and a first one of the external load terminals;
  a fourth switch between a second one of the external charging terminals and a second one of the external load terminals; and
  a fifth switch between the first switch and the third switch, the method further comprising, responsive to the DC voltage detected at the external charging terminals being less than the nominal voltage of the traction battery:
  opening the first, third, fourth, and fifth switches;
  closing the second switch; and
  operating the voltage converter to increase voltage from the external charging terminals to the nominal voltage of the traction battery.

13. The method of claim 10 wherein the plurality of switches include:
  a first switch between a first one of the external charging terminals and the traction battery;
  a second switch between the first external charging terminal and a lower voltage terminal of the voltage converter;
  a third switch between the second switch and a first one of the external load terminals;
  a fourth switch between a second one of the external charging terminals and a second one of the external load terminals; and
  a fifth switch between the first switch and the third switch, the method further comprising, responsive to the DC voltage detected at the external charging terminals being within a predetermined range of the nominal voltage of the traction battery, and the predetermined DC voltage being less than the nominal voltage of the traction battery:
  closing the first, third, and fourth switches;
  opening the second and fifth switches; and
  operating the voltage converter to decrease voltage from the external charging terminals to the predetermined DC voltage.

14. The method of claim 10 wherein the plurality of switches include:
  a first switch between a first one of the external charging terminals and the traction battery;
  a second switch between the first external charging terminal and a lower voltage terminal of the voltage converter;
  a third switch between the second switch and a first one of the external load terminals;
  a fourth switch between a second one of the external charging terminals and a second one of the external load terminals; and
  a fifth switch between the first switch and the third switch, the method further comprising, responsive to the DC voltage detected at the external charging terminals and the predetermined DC voltage both being less than the nominal voltage of the traction battery:

closing the second, third, and fourth switches;
opening the first and fifth switches; and
operating the voltage converter to increase voltage from the external charging terminals to the nominal voltage of the traction battery.

15. The method of claim 10 wherein the plurality of switches include:
a first switch between a first one of the external charging terminals and the traction battery;
a second switch between the first external charging terminal and a lower voltage terminal of the voltage converter;
a third switch between the second switch and a first one of the external load terminals;
a fourth switch between a second one of the external charging terminals and a second one of the external load terminals; and
a fifth switch between the first switch and the third switch, the method further comprising, responsive to no DC voltage detected at the external charging terminals and the predetermined DC voltage being less than the nominal voltage of the traction battery:
closing the third and fourth switches;
opening the first, second, and fifth switches; and
operating the voltage converter to decrease voltage from the traction battery to the predetermined DC voltage supplied to the external load terminals.

16. The method of claim 10 wherein the plurality of switches include:
a first switch between a first one of the external charging terminals and the traction battery;
a second switch between the first external charging terminal and a lower voltage terminal of the voltage converter;
a third switch between the second switch and a first one of the external load terminals;
a fourth switch between a second one of the external charging terminals and a second one of the external load terminals; and
a fifth switch between the first switch and the third switch, the method further comprising:
closing the fourth and fifth switches;
opening the first, second, and third switches; and
disabling the voltage converter to provide unregulated traction battery voltage to the external load terminals.

17. The method of claim 10 wherein the plurality of switches include:
a first switch between a first one of the external charging terminals and the traction battery;
a second switch between the first external charging terminal and a lower voltage terminal of the voltage converter;
a third switch between the second switch and a first one of the external load terminals;
a fourth switch between a second one of the external charging terminals and a second one of the external load terminals; and
a fifth switch between the first switch and the third switch,
the method further comprising, responsive to the DC voltage detected at the external charging terminals being within a predetermined range of the nominal traction battery voltage:
closing the first, fourth, and fifth switches;
opening the second and third switches; and
disabling the voltage converter to provide unregulated voltage from the external charging terminals to the external load terminals.

18. An electrified vehicle system comprising:
a traction battery;
a bi-directional synchronous DC/DC voltage converter;
a plurality of switches configured to selectively connect at least one of the voltage converter and the traction battery to at least one of external charging terminals and external load terminals; and
a controller programmed to operate the voltage converter in one of a disabled mode, boost mode, and buck mode based on which of the voltage converter, the traction battery, the external charging terminals, and the external load terminals are connected, and responsive to voltage of the traction battery relative to voltage at the external charging terminals and voltage supplied to the external load terminals.

19. The system of claim 18 wherein the plurality of switches comprises:
a first switch between a first one of the external charging terminals and the traction battery;
a second switch between the first external charging terminal and a lower voltage terminal of the voltage converter;
a third switch between the second switch and a first one of the external load terminals;
a fourth switch between a second one of the external charging terminals and a second one of the external load terminals; and
a fifth switch between the first switch and the third switch.

20. The system of claim 19 wherein the controller is programmed to operate the plurality of switches and the voltage converter to simultaneously supply power from the external charging terminals to the traction battery and the external load terminals.

* * * * *